United States Patent
Gany et al.

(10) Patent No.: US 8,789,795 B2
(45) Date of Patent: Jul. 29, 2014

(54) PROPULSION SYSTEM AND METHOD USING A COMBUSTION CHAMBER DISCHARGING A CONCENTRATED MASS

(75) Inventors: Alon Gany, Haifa (IL); Dan Michales, Kibbutz Kfar Ruppin (IL)

(73) Assignee: Technion Research and Development Foundation Ltd., Haifa (IL)

( * ) Notice: Subject to any disclaimer, the term of this patent is extended or adjusted under 35 U.S.C. 154(b) by 386 days.

(21) Appl. No.: 12/716,483

(22) Filed: Mar. 3, 2010

(65) Prior Publication Data

US 2010/0224731 A1   Sep. 9, 2010

(51) Int. Cl.
*B64G 1/40*   (2006.01)

(52) U.S. Cl.
USPC .............................. 244/171; 60/219; 102/377

(58) Field of Classification Search
USPC ............... 244/2, 158.1, 158.4, 171.1, 171.3, 244/172.4, 172.5; 60/257, 219, 374, 377, 60/378; 102/374, 377, 378, 257, 219
See application file for complete search history.

(56) References Cited

U.S. PATENT DOCUMENTS

| | | | |
|---|---|---|---|
| 6,352,030 B1 * | 3/2002 | Doll et al. | 102/291 |
| 6,968,676 B1 | 11/2005 | Krishnan | |
| 2004/0144280 A1 * | 7/2004 | Shi | 102/374 |
| 2009/0212163 A1 * | 8/2009 | Shi | 244/171.1 |

* cited by examiner

*Primary Examiner* — Timothy D Collins
*Assistant Examiner* — Nicholas McFall
(74) *Attorney, Agent, or Firm* — William H. Dippert; Eckert Seamans Cherin & Mellott, LLC

(57) ABSTRACT

A propulsion system and method are described configured to exert a force upon a vehicle. The system includes a concentrated mass which may be discharged from the vehicle by a propellant typically via an ejection tube. The system is optimized so that the discharged concentrated-mass imparts a large impulse upon the vehicle. The system and method may be used to alter the momentum of vehicles for propulsion, attitude correction, vehicle separation and the like.

22 Claims, 8 Drawing Sheets

PROPULSION SYSTEM AND METHOD USING A COMBUSTION CHAMBER DISCHARGING A CONCENTRATED MASS

FIELD OF THE INVENTION

The present invention relates to a vehicle propulsion system. In particular the invention relates to an impulse augmentation system for a rocket type combustion chamber.

BACKGROUND OF THE INVENTION

Reaction type rocket propulsion systems are often used to propel vehicles by burning a propellant in a combustion chamber and allowing the products of combustion to escape through a nozzle. According to the law of conservation of momentum, the change in momentum, or impulse, of the escaping products must produce an equal change in the momentum of the vehicle from which the products escape. Consequently, the reaction force generated by the burning propellant imparts thrust upon the vehicle.

Reference is now made to FIG. 1 showing a schematic representation of a typical rocket propulsion system 10 of the PRIOR ART. The prior art rocket propulsion system 10 includes a combustion chamber 12 and a nozzle 18. When propellant 14 contained within the combustion chamber is ignited, the products 16 of combustion are ejected from the nozzle 18.

The impulse that can be generated from a conventional rocket thruster such as shown in FIG. 1, depends upon the quantity and quality of propellant contained within the combustion chamber and the geometry of the nozzle. For a given amount of propellant, the thrust of a rocket motor can be written as $F = C_F P_c A_t$ where $P_c$, $A_t$ are the pressure in the combustion chamber and nozzle throat cross-section area, respectively. The thrust coefficient $C_F$ is typically about 1.6 and can reach 1.8 in space. In order to achieve high pressure in the combustion chamber for a given flow rate, the nozzle throat cross-section area in a typical rocket motor is relatively small.

The fact that the combustion gases leave the vehicle at high speed and temperature indicates that a significant portion of the energy of the propellant is lost.

The need remains therefore for an efficient rocket propulsion system which is able to convert a greater proportion of the energy of the propellant into kinetic energy of vehicle. Embodiments described herein address this need.

SUMMARY OF THE INVENTION

It is an object of some aspects of the embodiments described herein to provide a propulsion system configured to exert a force upon at least one vehicle. Accordingly, the system typically comprises at least one chamber for containing propellant; and at least one concentrated mass configured to be discharged from the vehicle when the propellant is activated so as to impart an impulse upon the vehicle. Generally, the propulsion system further comprises an ejection tube through which the concentrated mass is discharged.

Optionally, parameters of the propulsion system are optimized so as to maximize impulse imparted upon the vehicle. Such parameters may be selected from a group comprising: mass of propellant, mass of concentrated-mass, ejection tube diameter, propellant type, ejection tube length and chamber volume. The optimization may be achieved using at least one of: a two phase flow model, a lumped parameters model and a model based upon energy and mass conservation, a state equation for gases and a pressure gradient. Where appropriate, the lumped parameters model may include a momentum equation. Optimization may be further achieved using an empirical model of a propellant burn rate.

According to various embodiments of the propulsion system, the propellant comprises a fuel configured to generate high pressure products upon combustion. Such propellant may be selected from at least one of a group consisting: solid propellant grains, liquid propellant, and compressed gas.

Optionally, the concentrated mass comprises at least one of a group consisting of solid masses, liquids, gels, powdered materials and combinations thereof. The concentrated mass may be selected from at least one of a group consisting of: a dead-weight, a discarded section of the vehicle, a discarded case of a propellant charge, a traveling charge and combinations thereof.

In certain embodiments, the propulsion system further comprises a loading mechanism for introducing a new concentrated mass into an evacuated chamber. The propulsion system may further comprise a loading mechanism for introducing new propellant into an evacuated chamber.

Variously, the vehicle may be selected from a group consisting of: rockets, missiles, spacecraft, space stations, satellites, rocket stages and combinations thereof.

According to a specific embodiments, the propulsion system maybe configured to separate a first vehicle from a second vehicle wherein: the first vehicle serves as a first concentrated mass for propelling the second vehicle, and the second vehicle serves as a second concentrated mass for propelling the first vehicle. Typically, the first and second vehicles are selected from a group consisting of: satellites, spacecraft, space stations and rocket stages. Accordingly, the system may comprise a separation mechanism comprising: a first tube, connected to the first vehicle, and a second tube, connected to the second vehicle, wherein the first tube is nested inside the second tube such that, when the propellant is activated within the first tube, opposing forces are exerted upon the first tube and the second tube thereby separating the first vehicle from the second vehicle.

Optionally, in some embodiments, a series of pulse systems are installed where each system is applied as the concentrated mass of the next pulse round.

Another aspect of the embodiments is to teach a method for imparting an impulse upon a vehicle, the method comprising the steps: providing a propulsion system comprising at least one chamber and at least one concentrated mass; activating a propellant within the chamber; and discharging the concentrated mass from the vehicle.

Optionally, the step of activating the propellant comprises igniting the propellant. Alternatively, the propellant may comprise a compressed gas and the step of activating the propellant may comprise releasing the compressed gas.

Typically, the method further comprises a step of providing an ejection tube and wherein the concentrated mass is discharged through the ejection tube. The concentrated mass may be variously selected from at least one of a group consisting of: a dead-weight, a discarded section of the vehicle, a discarded case of a propellant charge, a traveling charge and combinations thereof.

In other embodiments, the method further comprises a step of optimizing parameters of the propulsion system so as to maximize impulse imparted upon the vehicle. Optionally the step of optimizing parameters of the propulsion system comprises the following sub-steps: selecting initial conditions to describe ignition of the propellant; preparing a set of differential equations describing the conditions in the evacuation tube and motion of the concentrated mass; preparing equations to describe motion of a flow field in the evacuation tube after the concentrated mass is evacuated, and solving the equations.

The differential equations typically, describe the conditions in the evacuation tube and may be prepared using at least one technique selected from a group consisting of: simulating the movement of the concentrated mass through the evacuation tube using an interior ballistics model; representing the spatial distribution of gas momentum in the evacuation tube by a pressure gradient model; introducing an energy conservation equation describing change in average temperature as a function of time; and using Noble-Able state equations for the average thermodynamic properties of gas contained by the evacuation tube.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Embodiments described herein relate to chemical thrusters, such as rocket propulsion systems, which are configured to discharge a concentrated mass so as to maximize the impulse imparted upon a vehicle. Variously, the concentrated mass may be a solid mass (weight), a liquid, gel, or powdered material as suit requirements.

Various embodiments of the present invention are particularly applicable to systems that require large impulses from relatively small quantities of propellant. For example, it can be used as a reaction jet control system for missiles or satellites, for maneuvering vehicles, docking, station keeping, trajectory correction or the like. Further selected applications are described hereinbelow, still others will be apparent to those skilled in the art.

Figure 2:
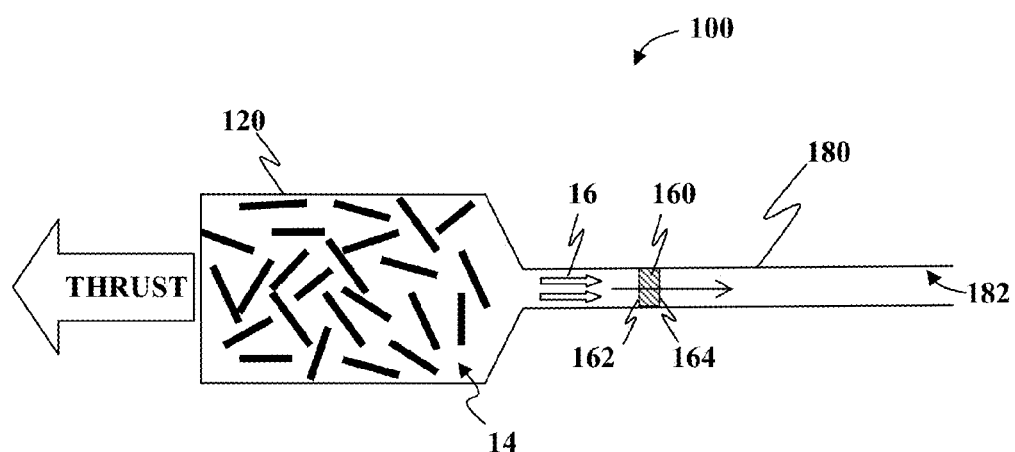
FIG. 2 is a schematic representation of an embodiment of a concentrated-mass propulsion system including a combustion chamber and an ejection tube.

Referring now to FIG. 2, a schematic representation is shown of an embodiment of a concentrated-mass propulsion system 100 configured to increase the impulse imparted upon a vehicle. The concentrated-mass propulsion system 100 includes a combustion chamber 120 containing propellant 14, an ejection tube 180 and a concentrated-mass 160.

Embodiments of the concentrated-mass propulsion system 100 may be used to propel various vehicles such as rockets, missiles, spacecrafts, space stations, satellites, rocket stages and the like as well as their combinations.

It is a particular feature of the embodiment, that when the propellant 14 is ignited, the products of combustion 16 such as gasses and the like, push against the concentrated-mass 160. The concentrated-mass 16 is configured to travel along the ejection-tube 180 before it is expelled from the vehicle.

Figure 1:
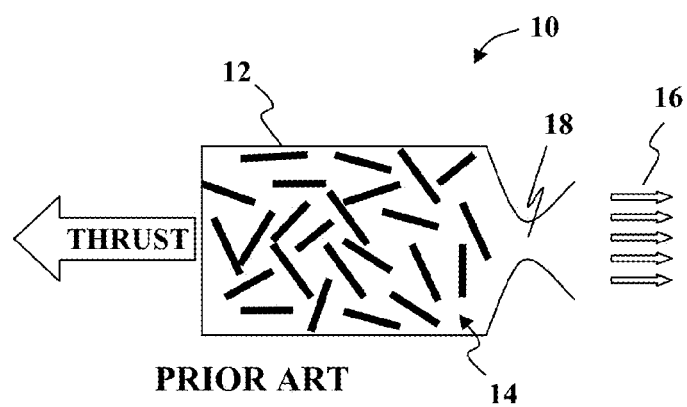
FIG. 1 is a schematic representation of a typical propulsion system of the PRIOR ART.

It is noted that by attaching an ejection-tube 180 to the combustion chamber 120 and placing the concentrated-mass 16 within it, the expansion of the gasses produced by combustion 16 is restricted. Furthermore, in contradistinction to the prior art rocket propulsion system 10 described hereinabove in relation to FIG. 1, high pressure in the combustion chamber 120 may be maintained even with a relatively large tube cross-section area. Thus according to the formula $F=C_F P_c A_t$, a larger thrust and total impulse may be imparted upon the vehicle for a given mass of propellant charge. Consequently, in some embodiments of the concentrated-mass propulsion system a smaller combustion chamber 120 is used containing only a few grams of propellant to produce a significant thrust.

When the propellant is burnt, the combustion-chamber pressure increases and pushes the concentrated mass 160 along the ejection tube 180. The concentrated mass 160 and the material of the ejection tube 180 are typically selected so that the concentrated mass 160 has a low coefficient of friction with the inner surface 182 of the ejection tube 180. The force on the concentrated mass 160, neglecting friction, is equal to the cross-section area of the ejection tube 180 multiplied by the pressure difference between the interior region adjacent to the internal surface 162 of the concentrated-mass 160 and the exterior region adjacent to the external surface 164 of the concentrated-mass 160.

In the first phase of the movement of the concentrated mass 160, the gas production rate of the propellant 14 is typically much more dominant than the volume increase due to the movement of the concentrated-mass 160 and as a result the combustion-chamber pressure rises very rapidly. The rise in combustion-chamber pressure may cause the concentrated-mass to accelerate until it reaches a velocity sufficiently high to make the volume increase more dominant than the gas production rate, at this stage the combustion-chamber pressure may decrease. The overall net force acting on the combustion chamber is equal to the combustion chamber pressure minus the ambient pressure, multiplied by the cross-section area of the tube.

The combustion-chamber pressure changes very rapidly as is observed when measuring the pressure experimentally, or calculating numerically. The time from the ignition of the propellant to the discharge of the concentrated mass may be only a few milliseconds. Fast burning of the propellant is desirable so that the propellant can burn while the concentrated mass is still in the tube. Fast burning can be achieved with the use of standard gun propellants, which have high burning rates at high pressures and are produced in several granular forms. The geometry of the propellant grains is an important parameter, for it controls the overall burning rate of a specific propellant.

Propulsion devices for low thrust, which are generally referred to as "micro-propulsion" systems are commonly classified as chemical or electrical propulsion thrusters. Embodiments of the present invention may be applicable to systems, such as micro-thrusters, which produce small pulses of thrust for trajectory corrections. Producing multiple pulses of thrust can be achieved by periodically re-loading the combustion-chamber 120 with new propellant and the ejection tube 180 with a new concentrated-mass 160. To this end, liquid, gel or powdered propellant may be used as suit requirements. Alternatively, a recharging mechanism may be used such as a semi-automatic gun reload mechanism for example.

Although embodiments described above relate to propellants which are activated by ignition within a combustion chamber and a dead-weight concentrated-mass, it will be appreciated that other embodiments may use other propellants and concentrated-masses as suit requirements. For example, according to certain embodiments, compressed gas may be released thereby imparting pressure within a pressure chamber. Accordingly, the resultant gas pressure may be directed towards discharging a concentrated-mass in order to impart impulse upon the vehicle. In other embodiments, a series of small propulsor cartridges filled with propellant are used with the spent propulsor cartridge case being utilized as the concentrated-mass to be ejected by the next propulsor. Still further embodiments utilize traveling charges to reduce the overall mass of the system. The traveling charge may serve as both propellant and concentrated mass traveling in the ejection tube.

In contradistinction to gun systems which aim to produce increased projectile speeds, embodiments of the current invention use the traveling charge concept to reduce the weight of the system. Furthermore, the mass ejected out of the tube may also be reduced as part of its mass is burnt during its travel, which may improve the safety of the system. Alternatively the concentrated mass is based upon a liquid, gel or powdered material having properties selected to suit requirements.

The interior ballistics of the system, according to embodiments of the present invention, are akin to the interior ballistics of gun systems. However, whereas gun systems are optimized to maximize muzzle velocities, it is a particular feature of embodiments of the concentrated-mass discharge propulsion system that they are optimized to maximize the impulse on the vehicle containing the combustion chamber. Owing to this fundamental difference, the parameters governing the problem, such as the mass ratio of propellant to concentrated mass, ejection tube diameter and the geometry and type of propellant are selected according to a different set of criteria than those of gun systems.

In particular, as discussed below in greater detail, a lumped parameters model based upon energy and mass conservation, a state equation for gases and a pressure gradient model may be used to optimize parameters in order to increase the impulse imparted upon the vehicle. Optimized parameters may include mass of propellant, mass of the concentrated-mass, the ejection tube diameter and length, the combustion chamber geometry, type of propellant and the like.

It is noted that embodiments of the concentrated-mass propulsion system may be particularly suitable for use with thrusters that aim at producing small pulses of thrust. For example embodiments may be provided for trajectory and attitude correction, such as in reaction jet control systems for missiles and satellites.

Other embodiments may be used for separating between rocket stages, undocking a spacecraft from a space station or otherwise separating space bodies. Where appropriate, the concentrated-mass may be a discarded section of the vehicle such as a rocket stage, waste disposal or the like. Alternatively, two bodies being separated may serve as concentrated-masses for each other.

Figure 3A:
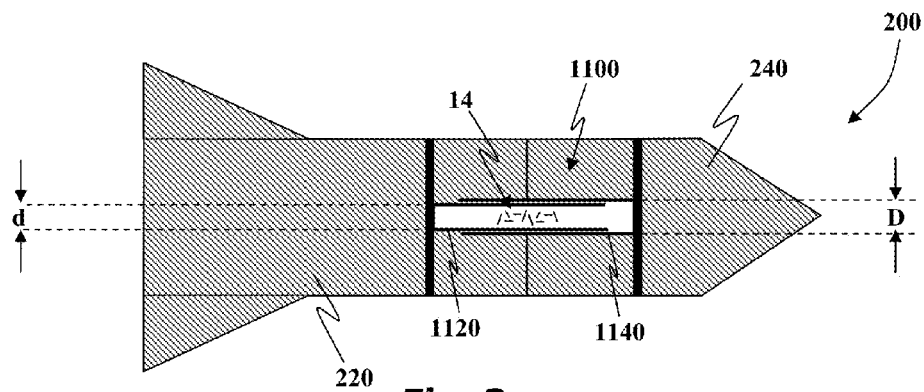
FIGS. 3a-c are a series of schematic diagrams representing a further embodiment of a concentrated-mass propulsion system being used to effect the separation of rocket stages.
Figure 3B:
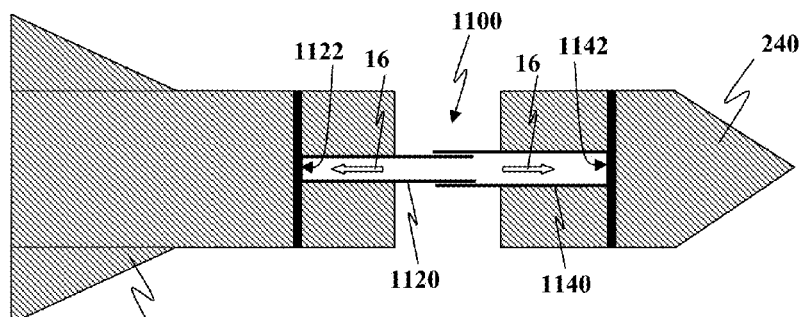
Figure 3C:
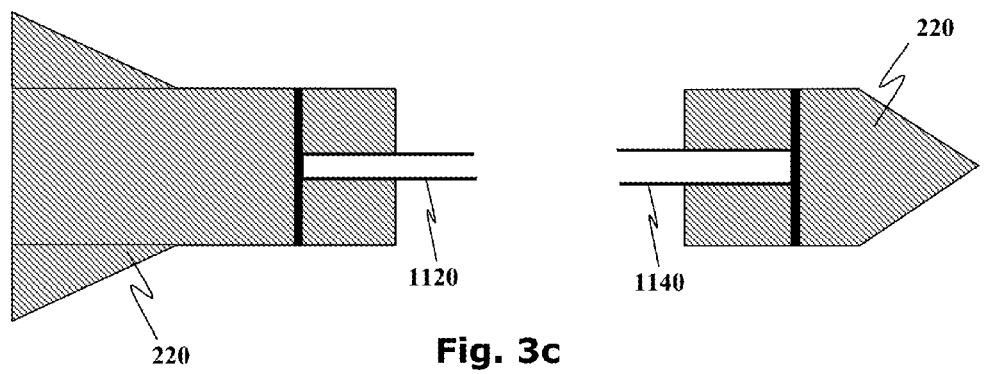

Reference is now made to FIGS. 3a-c showing a series of schematic cross sections representing a further embodiment of a concentrated-mass propulsion system 1100 being used to effect the separation of rocket stages. It is noted that the cross sections are presented for illustrative purposes only so as to more clearly explain the embodiment. No attempt has been made to represent the components to scale and it is to be understood that the relative sizes of the components may vary greatly between embodiments.

With specific reference to FIG. 3a, a rocket 200 is represented having a first stage 220 and a second stage 240. It is noted that during the course of the flight of the rocket 200, the second stage 240 may be separated from the first stage 220. The second stage 240 may be discarded or may continue a separate mission according to the situation. It is a particular feature of the embodiment that the two stages 220, 240 of the rocket 200 are separable by means of a nested-tube embodiment of the concentrated-mass propulsion system 1100.

The nested-tube embodiment of the concentrated-mass propulsion system 1100 comprises a first tube 1120 attached to the first rocket-stage 220 and a second tube 1140 attached to the second rocket-stage 240. The inner-diameter D of the second tube 1140 and the outer-diameter d of the first tube 1120 are selected such that the first tube 1120 is configured to nest inside the second tube 1140. A charge of propellant 14 is introduced into a combustion-chamber inside the first tube 1120. It will be appreciated that other configurations may be preferred in other embodiments to suit requirements.

Referring now to FIG. 3b, showing the nested-tube embodiment of the concentrated-mass propulsion system 1100 during combustion of the propellant 14. As a result of the combustion of the propellant 14, the products 16 of combustion push against the ends 1122, 1142 of the first and second tubes 1120, 1140. Because the tubes 1120, 1140 are attached to different rocket stages 220, 240, the thrust imparted upon the ends 1122, 1142 of the tubes 1120, 1140 causes the two rocket stages 220, 240 to separate. FIG. 3c shows the two rocket stages 220, 240 after separation.

It is noted that in the nested-tube embodiment of the concentrated-mass propulsion system 1100, each rocket stage 220, 240 effectively acts as a concentrated-mass for the other. Thus as described below, the specific impulse imparted by the system is typically larger than for traditional nozzle thrusters. It will be appreciated that as a result, only a small mass of propellant may be needed to provide sufficient separation force.

For example, calculations were performed for one nested-tube embodiment of the concentrated-mass propulsion system in which the mass of the first stage was 500 kg, the mass of the second stage was 200 kg, the two tubes were 75 cm in length and the inner tube outside diameter was 15 mm. According to our calculations, using only 1 gram of a standard solid propellant, the second stage gains a forward velocity of 2.5 meters per second and the first stage a backward velocity of 1 meter per second. The total impulse each body obtains is therefore 500 newton-seconds. In this example the maximum pressure in the tubes was just under 100 atm.

The specific impulse $I_{sp}$ is defined as the ratio of impulse to weight of propellant. This means that for the above described nested-tube embodiment of the concentrated-mass propulsion system the specific impulse is 50,000 sec. For comparison it is noted that a conventional solid rocket motor typically has a specific impulse of around 250 seconds meaning that in order to impart a similar impulse upon the rocket stages using a conventional solid rocket motor each of the stages would require 0.2 kg of the same propellant (200-times more than for the nested tube embodiment). Accordingly, the associated advantages of the concentrated-mass propulsion systems in terms of weight reduction and cost efficiency will be readily appreciated.

Although rocket stage separation is represented in the above embodiment, it will be appreciated that other embodiments may be applicable for use as separation mechanisms which may be used for example, to undock spacecraft from docking stations, for discarding spent sections, for separating sections of a single spacecraft or the like.

Figure 4A:
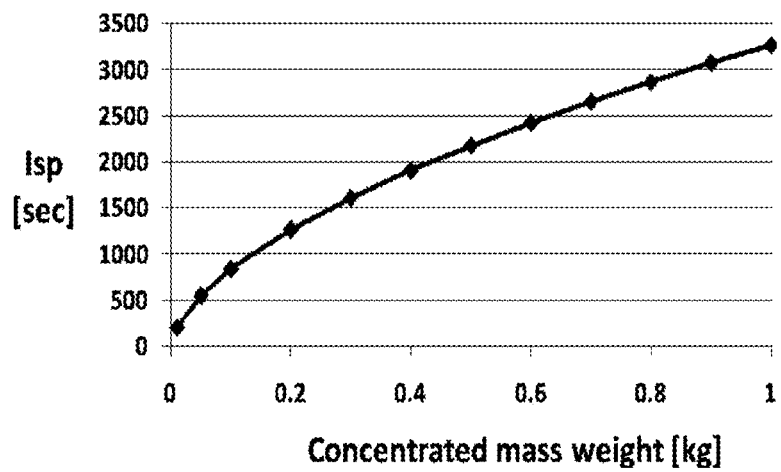
FIG. 4a is a graph showing how the specific impulse varies according to the weight of the concentrated mass ejected from embodiments of the concentrated-mass propulsion system having an ejection tube of length one meter using three grams of solid propellant.
Figure 4B:
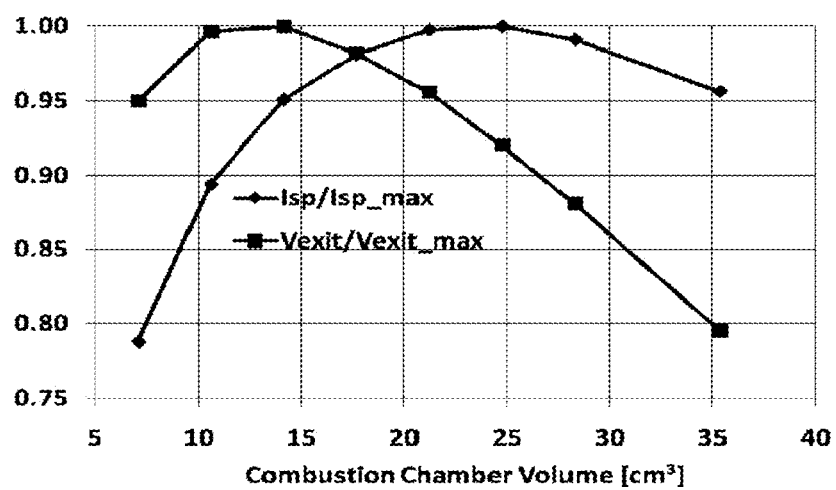
FIG. 4b is a graph showing how muzzle velocity and specific impulse vary according to the combustion-chamber volume of embodiments of the concentrated-mass propulsion system using three grams of solid propellant to eject a concentrated-mass of weight six grams.
Figure 4C:
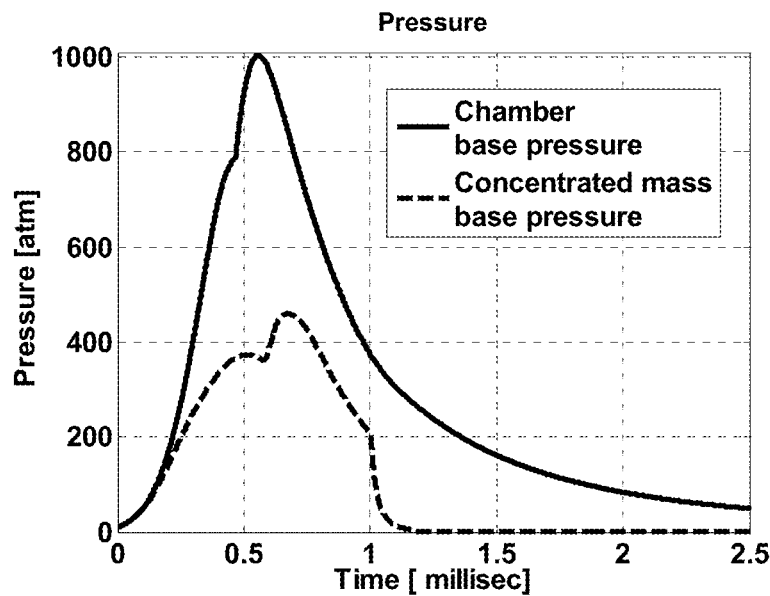
FIGS. 4c and 4d are graphs showing how pressure and thrust vary over time for a simulation of an embodiment of the concentrated-mass propulsion system using a propellant mass of 3 grams discharging a concentrated mass of 1.5 grams. It is noted that the calculated specific impulse is of 250 seconds.

The graphs of FIGS. 4a and 4b illustrate some dynamic characteristics of selected embodiments of the concentrated mass propulsion system. Referring specifically to the graph of FIG. 4a, the variation of specific impulse is shown for different concentrated masses. The graph represents calculations showing the effect of the size of the concentrated mass on the performance of a concentrated-mass propulsion consisting of 3 grams of solid propellant and tube length of 1 m. In order to keep a maximum pressure of 200 atm, the diameter is varied between calculations.

Turning now to the graph of FIG. 4b the effect of varying the volume of the combustion chamber upon muzzle velocity and specific impulse is shown. The graph represents calculations for a concentrated-mass propulsion system using a two phase flow model using 3 grams of WC818 propellant, a concentrated mass of 6 grams and a tube length of 1 m. The maximum value for specific impulse was 304 seconds and the maximum muzzle velocity was 870 meters per second.

Thus, by discharging a solid concentrated mass from a combustion chamber, it may be possible to achieve much higher impulses than from a conventional rocket motor. This approach may lead to propulsion applications for missile and satellite trajectory corrections, maneuvering and precision station-keeping by reaction jet control, as well as for stage and spacecraft separation, enabling much more efficient use of the propellant energy for propulsion applications.

Exemplary Optimization Procedures

The interior ballistics problem may be solved using a number of models for example a lumped parameters model or a two phase flow model as described hereinbelow.

The lumped parameters model is based on existing models, and it is specifically adapted to our purpose. The lumped parameters model uses energy and mass conservation, a state equation for the average properties of the gas, and a pressure gradient model to represent the momentum equation. In addition, an empirical model of the propellant burn rate is used. A set of coupled ordinary differential equations (ODE) are derived and from its solution we get, among other parameters, the pressure at the base of the combustion chamber, which is used to calculate the thrust.

The two-phase flow model outlined below is a one-dimensional model with combustion. This model provides insight into the flow field and produces solutions for conditions that are very different from those assumed in the lumped parameters model. For example, the model considers a varying cross-section area of the tube and propellant masses larger than that of the mass of the concentrated-mass. A two-phase flow solution may generate better results for thrust during gas ejection out of the tube and may be used to investigate the ignition phase, which can be significant in some cases.

Our aim is to find the system parameters that will result in the highest total impulse under practical constraints. Reducing the rate of the volume increase will result in a longer period of high pressure in the combustion chamber, and therefore in a larger total impulse. The rate of the volume increase is essentially relative to the concentrated mass velocity (the volume increase due to propellant burning is relatively small), so increasing this mass will decrease its acceleration and hence its velocity, resulting in a larger total impulse. Reducing the tube diameter will reduce the force acting on the concentrated mass and its acceleration, resulting in higher pressures for a longer period of time, but it will also reduce the thrust for a given pressure. Therefore, the influence of the tube diameter on the total impulse is not obvious. The results of our simulation show that for given operating parameters there is a specific tube diameter that will result in a maximum total impulse, and any increase or decrease will reduce performance.

Lumped Parameters Model

In the present section a model based on the lumped parameters interior ballistics approach will be introduced. In order to simulate the stage in which the concentrated mass is moving in the tube we will use a model commonly used for gun simulations. For the subsequent stage, where the gases are expelled from the tube after the ejection of the concentrated mass, a standard model of a rocket motor having a choked converging nozzle will be used.

The main assumption in the lumped parameters model is that the average properties of the gas vary in time only, therefore one obtains a set of ordinary differential equations for the gas properties variation in time. Here we will introduce the basic assumptions, the main sub-models and the final equations. In the model presented here, the basic assumptions are:

The tube diameter is constant.
The gas follows the Nobel-Able state equation, which takes into account gas molecules co-volume.
Steady state propellant burning rate equation is used.
At t=0 all of the propellant is uniformly ignited.
The burnt gas composition remains constant.
Lagrange model for the pressure gradient in the tube is assumed.
After the concentrated mass ejection, the gas discharge is similar to that of a rocket motor with a chocked converging nozzle.

Lagrange pressure gradient model—A pressure gradient model is used to represent the spatial distribution of gas momentum in the tube. A pressure gradient model suggests fixed ratios between the average pressure ($P_A$), the pressure at the base of the concentrated mass ($P_B$), and the pressure at the base of the combustion chamber ($P_C$). The Lagrange gradient model is commonly used in gun interior ballistics lumped parameters models. In this model, the fixed relation between $P_A$, $P_B$ and $P_C$ is given by:

$$P_A = \left(1 + \frac{C}{3M}\right)P_B, \; P_C = \left(1 + \frac{C}{2M}\right)P_B \quad (1)$$

where $m_P$ is the propellant mass and M is the weight's mass.

Heat losses to the tube walls—An empirical model, evaluating the energy losses from the gas due to heat transfer to the tube, was developed by Hunt. In this model the energy losses are given by:

$$E_h = \frac{0.38 d_t^{1.5} [x_{CM} + V_{c,0}/A] T_c \dot{x}_{CM}^2}{[1 + 0.6 d_t^{2.175}/C^{0.8375}] V_m^2} \quad (2)$$

$V_m$ is the velocity at which the concentrated mass exits from the tube (muzzle velocity). Notice that $V_m$ is unknown, therefore the solution must be found iteratively. Since the concentrated mass exit velocity is not very sensitive to the energy losses, usually only 2-3 iterations are required. We also looked at the heat loss model of Nordheim and a turbulent boundary layer model, which are used in lumped parameter models and PDE models. The energy losses obtained with the use of Nordein's model and the turbulent boundary layer model were quite similar to Hunt's model in several cases we looked into. We have chosen to use Hunt's heat transfer model in our lumped parameters model since Hunt's model, unlike the two other models, does not require as input the distribution of the gas properties in the tube.

Equation of state and mass conservation—The Noble-Able equation of state for the average thermodynamic properties of the gas will be used:

$$P_A(V - m_g \eta) = m_g \frac{R_0 T_A}{M_W} \quad (3)$$

This equation of state holds at high temperature and pressure (mainly very high pressures), where the finite volume of the gas molecules should be taken into consideration.

Propellant burning rate—The propellant's steady state burning rate is assumed:

$$\dot{r} = a P_A^n; \quad (4)$$

The equations of motion of the concentrated mass—The concentrated mass equations of motion are:

$$\frac{dx_{CM}}{dt} = \dot{x}_{CM}, \; \frac{d\dot{x}_{CM}}{dt} = \frac{P_B - P_a - P_r}{M} A \quad (5)$$

$P_r$ is the pressure equivalent of the resistive (friction) force of the concentrated mass in the tube. In other investigations of smooth gun tubes or ballistic launchers this friction is neglected or taken as a constant value of a few atmospheres, and the same is assumed here.

Interior ballistics equations—By using the equations for energy conservation and the Noble-Able equation of state one can obtain the following equation:

$$P_A(t) = \frac{m_P Z(t)\lambda - \frac{1}{2}(\gamma - 1)\left[\frac{m_P Z(t)}{3} + M\right]\dot{x}_{CM}^2 - (\gamma - 1)E_h}{\left\{V_{c,0} + x_{CM} \cdot A - C \cdot \left[\frac{1}{\rho_P} + Z(t)\left(\eta - \frac{1}{\rho_P}\right)\right]\right\}} \quad (6)$$

Notice that Z(t), which is the part of propellant burnt by the time t, can be expressed as a function of the burning front progress r(t). Therefore, equation (6) is an expression for the average pressure of the gas that changes in time as functions of $x_{CM}(t)$, $\dot{x}_{CM}(t)$ and r(t). Equations (4) and (5), together with the relations in equations (1), (2) and (6), form a set of coupled ordinary differential equations. The initial burning front progress (r) will be chosen in a way that describes the ignition.

Gas Discharge from the Combustion Chamber

At the moment the concentrated mass leaves the tube we stop following the motion of the concentrated mass and the problem is treated with rocket motor equations. Just before the concentrated mass leaves the tube, there is a velocity profile of the gas in the tube, going from stagnation in the combustion chamber to the concentrated mass ejection velocity at the tube exit. After the concentrated mass leaves the tube, the gas conditions in the tube exit will adjust rapidly to the sonic conditions. This transient phenomenon is outside the scope of the present model, and it is assumed to be very rapid and to have a small effect on the total impulse.

Thrust Calculations

The thrust in our system is the total force acting on the combustion chamber and the tube. During the time the concentrated mass is traveling in the tube, the thrust is given by (neglecting the friction force between the concentrated mass and the tube wall):

$$F = (P_C - P_a) \cdot A \quad (7)$$

The slight increase in thrust due to pressure lower than $P_C$ at the rear of the combustion chamber, because of the gas velocity there, is neglected.

Two Phase Flow Model

In this section we will introduce a two-phase flow model for the interior ballistics problem. We developed the model of the present work using the approach presented by P. S. Gough. The model is based on the solution of the quasi-one-dimensional conservation equations of mass, momentum and energy for the average properties of the gas phase and solid phase in regions large enough to contain many solid particles, but still small relative to the flow field. There are other approaches for modeling gas-particle flow, such as the combined continuum and discrete model, and the continuum mixture theory, but they will not be discussed here. We assume that the flow properties variations in each cross-section are negligible in comparison to the axial variations, leading to the quasi-1D equations. In the literature there are also 2D axisymmetric and 3D solutions. However, it is not expected that such models will noticeably improve the results of our model with respect to the system thrust and impulse. The flow in the tube is turbulent, since the Reynolds number in the tube is very high, above 500,000, for the gas conditions in the tube for most of the ballistic cycle. Therefore, lateral transport of mass, momentum and energy is very rapid, so the uniform flow assumption is quite reasonable.

The heat transfer from the gas to the tube walls and to unburnt propellant grains, the propellant combustion, the inter-phase drag, and the inter-granular stress (force resulting from particle-particle interactions), are modeled through empirical correlations that are functions of the average state of the two phases. The gas thermodynamic properties follow the Nobel-Able equation of state, which takes into account the gas molecules co-volume. The solid particles are considered to be incompressible. Additionally, the combustion process of the propellant grains is assumed to be quasi-steady and depends only on the local pressure. The chemical composition of the gas is assumed to be uniform and equal to that of the combustion products ("Frozen" flow).

At ignition an influx of high temperature gas spreads through the propellant grains. The propellant grains ignite due to heat convection and radiation from the igniter gas and the combustion products from the propellant grains that were previously ignited. It should be mentioned that the primary motivation for two-phase interior ballistics models was to study the pressure waves in the ignition phase.

In order to discuss the heterogeneous two-phase flow, the porosity ($\epsilon$) is defined as the volume fraction of the gas phase in the control volume. Since we assume that the fluid properties vary only in the axial direction, the porosity also represents the fraction of the cross-section occupied by the gas phase. The conservation equation of mass, momentum and energy will be now written for the gas and solid phases.

We will derive the governing physical laws through the control surface, in a similar way that others used to derive the unsteady, one-dimensional flow with area change, friction and heat transfer or combustion.

Gas Phase Continuity Equation:

The change in the mass of the gas in the CV (control volume) plus the total gas flux out of the CV equals the rate of gas creation in the CV:

$$\frac{\partial}{\partial t}(\rho_g \epsilon A dx) + \frac{\partial}{\partial x}(\rho_g u_g \epsilon A) dx = \dot{m}_C'' A dx \qquad (8)$$

$\dot{m}_C''$ is the rate of gas generation per unit volume due to the solid propellant combustion. Here we assume that the combustion products are the same as the igniter gas, and that the combustion process is much faster than the fluid dynamic processes, so we can look only at the final combustion products. We can express $\dot{m}_C''$ as:

$$\dot{m}_C'' = \dot{r} \rho_p \frac{S_{ip}}{V_{ip}} \cdot (1-\epsilon) \qquad (9)$$

Extending the expression in Eq. (8), substituting Eq. (9) and dividing by Adx gives:

$$\frac{\partial}{\partial t}(\rho_g \epsilon) + \frac{\partial}{\partial x}(\rho_g u_g \epsilon) = \dot{m}_C'' - \frac{\rho_g u_g \epsilon}{A} \frac{dA}{dx} \qquad (10)$$

Solid Phase Continuity Equation:

We assume that the solid phase in incompressible ($\rho_P$=const), and derive the continuity equation for the solid phase with a procedure similar to that shown for the gas phase:

$$\frac{\partial}{\partial t}(1-\epsilon) + \frac{\partial}{\partial x}(u_p(1-\epsilon)) = -\frac{\dot{m}_C''}{\rho_p} - \frac{u_p(1-\epsilon)}{A} \frac{dA}{dx} \qquad (11)$$

Gas Phase Momentum Equation:

The change in momentum of the gas phase in the CV is caused by the flux of the gas in and out of the CV, the added momentum of the combustion products, the pressure gradient, and the inter-phase drag force. We get:

$$\frac{\partial}{\partial t}(\rho_g u_g \epsilon A dx) + \frac{\partial}{\partial x}(\rho_g u_g^2 \epsilon A) dx = -\epsilon A \frac{\partial p_g}{\partial x} dx + \dot{m}_C'' u_p A dx - D A dx \qquad (12)$$

We consider the inter-phase drag force as a microscopic phenomenon, since it occurs between the individual solid particles and their immediate surrounding gas. Since we are looking at a CV that may contain many particles, we need an expression for the total inter-phase drag, acting on all of the particles in the CV. In the literature there are a few empiric models for the inter-phase drag force, which generally depend on Reynolds number of the particle and the porosity. We shall follow the most commonly used model:

$$D = \frac{1-\epsilon}{D_p} \rho_g(u_g - u_p)|u_g - u_p| \cdot \begin{cases} 1.75 & \epsilon \leq \epsilon_0 \\ 1.75\left[\frac{1-\epsilon}{1-\epsilon_0} \cdot \frac{\epsilon_0}{\epsilon}\right]^{0.45} & \epsilon_0 \leq \epsilon \leq \epsilon_1 \\ 0.3 & \epsilon_1 < \epsilon \leq 1 \end{cases} \qquad (13)$$

where $$D_p = 6\frac{V_{ip}}{S_{ip}}$$

is the effective diameter of the propellant grains, and $\epsilon_1$ is given by:

$$\epsilon_1 = \left[1 + 0.02 \cdot \frac{1-\epsilon_0}{\epsilon_0}\right]^{-1} \qquad (14)$$

At $\epsilon > \epsilon_1$ the gas-particle flow is considered dilute, and at $\epsilon \leq \epsilon_0$ the particles are considered to be compact. A customary value for $\epsilon_0$ is 0.4.

Solid Phase Momentum Equation:

The change in momentum of the solid phase in the CV is caused by the flux of the solid in and out of the CV, the lost momentum due to combustion, the pressure gradient, the inter-phase drag force, and the change in momentum due to particle-particle collisions at the interface with the adjacent CV's (inter-granular stress). We get:

$$\frac{\partial}{\partial t}(\rho_p u_p(1-\epsilon)A dx) + \frac{\partial}{\partial x}(\rho_p u_p^2(1-\epsilon)A) dx = \qquad (15)$$
$$-(1-\epsilon)A\frac{\partial p_g}{\partial x}dx - \dot{m}_C'' u_p A dx + D A dx - \frac{\partial}{\partial x}(A(1-\epsilon)R)dx$$

The inter-granular stress is caused by particle-particle interaction. It can be related to the speed of wave propagation of inter-granular disturbances:

$$a_R^2 = \frac{1}{\rho_p} \frac{\partial}{\partial \varepsilon}(1-\varepsilon)R \quad (16)$$

The speed of wave propagation is assumed to be negligible in the dilute gas and linearly increase to a maximum when the grains are packed:

$$a_R = \begin{cases} 0 & \varepsilon > \varepsilon_0 \\ a_1 \frac{\varepsilon_0}{\varepsilon} & \varepsilon \leq \varepsilon_0 \end{cases} \quad (17)$$

Reasonable values of $a_1$ and $\varepsilon_0$ are 400 msec and 0.4, respectively. From Eqs. (16) and (17) the inter-granular stress can be calculated:

$$R(\varepsilon) = \begin{cases} 0 & \varepsilon > \varepsilon_0 \\ \dfrac{\rho_p a_1^2 \varepsilon_0 (\varepsilon_0 - \varepsilon)}{\varepsilon(1-\varepsilon)} & \varepsilon \leq \varepsilon_0 \end{cases} \quad (18)$$

Gas Phase Energy Conservation Equation:

We will look at the first law of thermodynamics for open system with regard to the gas phase in the CV:

$$\frac{dU}{dt} = \frac{\delta Q}{dt} - \frac{\delta W}{dt} + \frac{dH_{in}}{dt} - \frac{dH_{out}}{dt} \quad (19)$$

The internal energy of the gas in the CV is:

$$U = \rho_g \left( e_g + \frac{u_g^2}{2} \right) \varepsilon A dx, \quad (20)$$

$$e_g = C_V T_g = \frac{R_0 T_g}{M_W (\gamma - 1)}$$

The total flux of enthalpy into the system through its boundary and the added enthalpy of the combustion products is:

$$\frac{dH_{in}}{dt} - \frac{dH_{out}}{dt} = \quad (21)$$

$$-\frac{\partial}{\partial x}\left( \rho_g \left( e_g + \frac{u_g^2}{2} + \frac{p_g}{\rho_g}\right) u_g \varepsilon A \right) dx + \dot{m}_C'' \left( e_c + \frac{p_g}{\rho_p} + \frac{u_p^2}{2}\right) A dx$$

$e_c$ is the specific internal energy of the combustion products. The work done by the gas on the solid phase by means of drag and due to the change in the solid phase volume is:

$$\frac{\delta W}{dt} = -p_g \frac{\partial}{\partial t}[A dx (1-\varepsilon)] + u_p D A dx \quad (22)$$

Heat is transferred from the gas to the tube walls via a forced convection mechanism:

$$\frac{\delta Q}{dt} = -\pi \cdot d_t \cdot q_{wall} dx, \quad (23)$$

$$q_{wall} = h \cdot (T_g - T_{Wall}) \left[ \frac{W}{m^2} \right]$$

The convective heat transfer coefficient is calculated with an empirical correlation for the Nusselt number, derived for turbulent and thermally developed flow in a smooth tube:

$$Nu = 0.023 \cdot Re^{0.8} \cdot Pr^{\frac{1}{3}}, \quad (24)$$

$$Nu = \frac{h d_t}{\lambda_g}$$

Here $\lambda_g$ is the thermal conductivity of the gas. Reynolds and Prandtl numbers are functions of the average properties of the gas:

$$Re = \frac{\rho_g u_g d_t}{\mu}, \quad (25)$$

$$Pr = \frac{\mu C_p}{\lambda_g}$$

In our calculations we will take the gas viscosity to be $$5 \cdot 10^{-5} \frac{kg}{m \cdot sec}.$$

For polyatomic gas the Prandtl number is:

$$Pr = \frac{4\gamma}{9\gamma - 5} \quad (26)$$

Substituting Eqs. (20)-(23) into Eq. (19) we get the gas phase energy conservation equation:

$$\frac{\partial}{\partial t}\left( \rho_g \left( e_g + \frac{u_g^2}{2}\right) \varepsilon A dx \right) = \quad (27)$$

$$-\frac{\partial}{\partial x}\left( \rho_g \left( e_g + \frac{u_g^2}{2} + \frac{p_g}{\rho_g}\right) u_g \varepsilon A \right) dx + \ldots + \dot{m}_C''\left( e_C + \frac{p_g}{\rho_p} + \frac{u_p^2}{2}\right)$$

$$A dx + p_g \frac{\partial}{\partial t}[A dx (1-\varepsilon)] - u_p D A dx - \pi \cdot d_t \cdot q_{wall} dx$$

Solid Particle Combustion:

All of the solid particle grains are assumed to ignite instantaneously and burn as function of the local pressure, according to Eq. (4). We will follow the burning front progress of each group of particle by the Lagrange approach:

$$\frac{Dr}{Dt_p} = \frac{\partial r}{\partial t} + u_p \frac{\partial r}{\partial x} = a p_g^n \quad (28)$$

After some manipulation of Eqs. (10), (11), (12), (15), (27) and (28) we can write them in the following form:

$$\frac{\partial W}{\partial t} + \frac{\partial F(W)}{\partial x} = S(W) - C(W)\frac{\partial W}{\partial x} \quad (29)$$

We define:

$$W = \begin{pmatrix} \rho_g \varepsilon \\ 1 - \varepsilon \\ \rho_g u_g \varepsilon \\ \rho_p u_p (1-\varepsilon) \\ \rho_g \varepsilon \left( e_g + \dfrac{u_g^2}{2}\right) \\ d \end{pmatrix} \quad (30d)$$

-continued $$F(W) = \begin{pmatrix} \rho_g u_g \varepsilon \\ u_p(1-\varepsilon) \\ \varepsilon(\rho_g u_g^2 + p_g) \\ (1-\varepsilon)(\rho_p u_p^2 + p_g + R) \\ \rho_g u_g \varepsilon \left(e_g + \frac{u_g^2}{2} + \frac{p_g}{\rho_g}\right) \\ 0 \end{pmatrix}$$

$$C(W)\frac{\partial W}{\partial x} = \begin{pmatrix} 0 \\ 0 \\ -p_g \frac{\partial \varepsilon}{\partial x} \\ p_g \frac{\partial \varepsilon}{\partial x} \\ p_g \frac{\partial}{\partial x}(u_p(1-\varepsilon)) \\ u_p \frac{\partial d}{\partial x} \end{pmatrix}$$

$$S(W) = \begin{pmatrix} \dot{m}_C'' - \frac{\rho_g u_g \varepsilon}{A}\frac{dA}{dx} \\ -\frac{\dot{m}_C''}{\rho_P} - \frac{u_p(1-\varepsilon)}{A}\frac{dA}{dx} \\ \dot{m}_C'' u_p - D - \frac{\varepsilon \rho_g u_g^2}{A}\frac{dA}{dx} \\ -\dot{m}_C'' u_p + D - \frac{(R+\rho_p u_p^2)(1-\varepsilon)}{A}\frac{dA}{dx} \\ \dot{m}_C''\left(e_p + \frac{u_p^2}{2}\right) - u_p D - \frac{4}{d_t} \cdot q_{wall} - \\ \left[\rho_g u_g \varepsilon\left(e_g + \frac{u_g^2}{2} + \frac{p_g}{\rho_g}\right) - p_g u_p(1-\varepsilon)\right]\frac{1}{A}\frac{dA}{dx} \\ aP_g^n \end{pmatrix}$$

A computer code has been developed for the solution of the problem. The set of partial differential equations is solved with the finite volume Rusanov scheme (an approximate Riemann solver) for the gas and solid properties distribution as a function of time. It should be pointed out that the differential equations are totally hyperbolic only when the velocity difference between the phases is small and when there is sufficient inter-granular stress. Fortunately, at the beginning of the combustion process the solid phase volume fraction is high enough to ensure sufficient inter-granular stress, and as the solid grains burn and become smaller, the inter-phase drag force increases and preserves the hyperbolic nature of the equations. We dealt with the increasing volume of the solution domain by using a stretching grid and a constant number of cells. That was done by transforming the equation from the (x, t) plane to ($\xi$, t) plane, where $\xi=x/x_{CM}$ and $x_{CM}$ is the concentrated mass base location.

Impulse Augmentation Concept:

The aim of this section is to show the potential performance of the propulsion system, and understand the influence of the various parameters of the system, such as geometry and mass properties, on the total impulse obtained from the system. The main point of interest is the possibility to obtain augmented total impulse from the arrangement of combustion chamber expelling a concentrated mass, compared to the impulse that can be obtained from a rocket motor with the same amount of propellant. The total impulse acting on the thruster over the entire force action is:

$$I = \int F dt \tag{31}$$

In a conventional rocket motor, the overall action time is practically the overall propellant burning time (neglecting the minor effect of the chamber gas discharge tale-off after burnout). When using a concentrated mass discharging through an exhaust tube, impulse continues to build up during the entire traveling time of the weight in the tube, and even later during the discharge of the entire amount of burnt propellant gases through the tube. By optimizing the geometry of the combustion chamber and exhaust tube, the propellant burning time and ratio between propellant and concentrated mass, accounting for practical constraints and limitations, one may be able to increase total impulse by as much as an order of magnitude. Of course, the penalty is the additional weight of the concentrated mass. However, as stated above, the concentrated mass may comprise system parts or wastes that have already served their main purpose.

For comparison reasons it will be convenient to make the calculations on the basis of the specific propellant weight. This leads to the conventional definition of the average specific impulse:

$$I_{sp} = \frac{I}{m_p g_0} \tag{32}$$

Here I is the total impulse, $m_p$ is the propellant's mass, and $g_0$ is the standard gravitational acceleration. With a conventional solid propellant rocket motor the obtainable specific impulse does not exceed approximately 250 seconds.

Figure 4D:
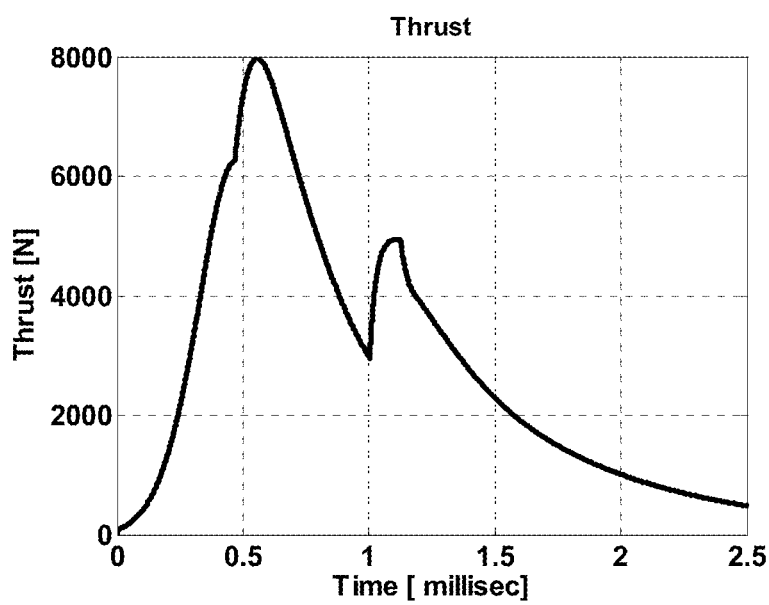

By using 3 grams of propellant and 1.5 grams of concentrated mass, a specific impulse of 250 seconds was calculated, similar to that of a solid propellant rocket. The results were obtained for certain system parameters that included a converging section at the tube's exit, and ball propellant grains with the same thermodynamic and chemical properties of the standard WC-844, but a smaller diameter of 0.17 mm (similar to the Olin WC-400 series). The simulation results, obtained with our two-phase flow model, are presented in FIGS. 4d and 4e. Increasing the concentrated mass weight increases the specific impulse, attaining as high as 3,000 second for a concentrated mass of about 1 kg, as presented in FIG. 4a.

When a separation of two large bodies in space is considered, such as separation between rocket stages or satellite separation, then one body can act as a weight for the other body, and a very small amount of propellant may be needed to achieve a substantial impulse. In such a case the overall impulse delivered to the bodies may be larger than that of a rocket motor by orders of magnitude.

Parametric Investigation

The goal of the parametric investigation is to look at the system from a new perspective of maximum impulse on the combustion chamber and tube. The system geometry, propellant type and the weight of propellant and concentrated mass are the design parameters, which may be optimized in order to achieve the desired performance. The effect of the ratio between the propellant and the concentrated mass on the total impulse was demonstrated in FIG. 4a. In the present section we investigate the effect of the tube diameter and combustion chamber volume.

Increasing the tube diameter has two contrasting effects on the total impulse. On one hand, increasing the tube diameter increases the thrust of the system for a given pressure. On the other hand, increasing the tube diameter results in faster pressure drop due to the concentrated mass movement, and thus reduces the total impulse. Therefore there should be a specific tube diameter that results in the maximum total impulse. If the combustion chamber volume, which defines the initial void volume, is kept constant while increasing the tube diameter, the maximum pressure will decrease because of the faster pressure drop. Since we are interested in investigating the influence of the system parameters under a design restriction, we change the tube diameter and initial chamber volume in a way that keeps the maximum pressure constant. A representative result is shown in FIG. 4b.

FIG. 4b demonstrates that for given propellant and concentrated mass, the geometry of the system that produces maximum impulse is quite different from that which gives the maximum concentrated mass ejection velocity (i.e. muzzle velocity). This illustrates the difference in design between a gun system and the presented propulsion system.

Interior Ballistics

By way of a further example, the following analysis presents an interior ballistics model simulating the first stage, in which the concentrated mass is moving in the tube. In the following section a second model will be presented to simulate the subsequent stage, where the gases are expelled from the tube after the ejection of the concentrated mass. For the first stage we will examine a lumped parameter model that takes into account the pressure gradient of the gas in the tube, the non-ideality of the gases, and the energy losses due to heat transfer to the tube walls. For the second stage, a standard model of a rocket motor with a converging nozzle will be used. Before going into the details of the models for the interior ballistics, the definition of the physical system will be completed by introducing the propellant characteristics.

Propellant Characteristics

The time from the ignition of the propellant to the discharge of the concentrated mass is very short (about 10-30 milliseconds). Therefore a very fast burning of the propellant is required. A fast burning rate can be achieved with the use of standard gun propellants, which have high burning rates at high pressures and are produced in several granular forms. Examples of standard gun propellants, including their thermodynamic properties and burning rates, are known in the art.

The geometry of the propellant is an important parameter for controlling the overall mass burning rate of a specific propellant. In our system the propellant is composed of N single perforated cylindrical grains with an outer diameter ($d_{out}$) smaller than the length ($L_p$). The burning occurs simultaneously on the inner, outer and side surfaces.

The part of propellant burnt by the time t is given by:

$$Z(t) = \frac{\rho_p \int_0^r A_b(r)\,dr}{m_p} \quad (101)$$

Here r(t) is the burning front advancement.
The initial mass of the propellant is:

$$m_p = N\pi(d_{out}^2 - d_{in}^2)\rho_p L_p/4 \quad (102)$$

and the burning surface area, as a function of the burning front advancement is:

$$A_b = N \cdot \left[\pi(d_{in} + d_{out}) \cdot (L_p - 2r) + 2\pi\left(\left(\frac{d_{out}}{2} - r\right)^2 - \left(\frac{d_{in}}{2} + r\right)^2\right)\right] \quad (103)$$

Substitution of (102) and (103) into (101) gives:

$$Z(t) = \left(\frac{2}{L} + \frac{2}{W}\right)r(t) - \frac{4r^2(t)}{WL} \quad (104)$$

Where W is the web thickness, defined as: $W = (d_{out} - d_{in})/2$
Because of the simultaneous internal and external combustion, the complete flame front regression is W/2.

Lumped Parameters Interior Ballistics Model

A gun interior ballistics model is introduced in order to simulate the stage in which the concentrated mass is moving in the tube. The model is based on lumped parameters models, frequently used for gun interior ballistics simulation and is adapted specifically for our problem. The basic assumption in the lumped parameters model is that the average properties of the gas vary in time only, therefore one obtains a set of ordinary differential equations for the gas properties variation in time. In the model presented here, the basic assumptions are:

The flow is treated as one-dimensional, compressible and non-viscous.

The gas follows the Nobel-Able state equation, which takes into account gas molecules co-volume.

Steady state propellant burning rate equation.

At t=0 all of the propellant is uniformly ignited.

The burnt gas composition remains constant.

The concentrated mass moves in the tube with no friction.

A model for the pressure gradient in the tube is assumed.

Pressure Gradient Model

A pressure gradient model is used to represent the spatial distribution of gas momentum in the tube. A pressure gradient model suggests fixed ratios between the average pressure ($P_A$), the pressure at the base of the concentrated mass ($P_B$), and the pressure at the base of the combustion chamber ($P_{BR}$). The constant gradient comes from the assumption that the gas properties change instantaneously according to the concentrated mass location and velocity, which is equivalent to an assumption of an infinite speed of sound in the gas. The Lagrange gradient model is commonly used in gun interior ballistics lumped parameters models. In this model, the fixed relation between $P_A$, $P_B$ and $P_{BR}$ is given by:

$$P_{BR} = \left(1 + \frac{m_p}{2M}\right)P_B \quad (105)$$

$$P_A = \left(1 + \frac{m_p}{3M}\right)P_B \quad (106)$$

The Lagrange pressure gradient model is based on the approximate solution of the Lagrange problem, where the gun is assumed to be a circular cylinder, the propellant is burnt before the projectile moves, the gas is inviscid and there are no heat losses to the walls. In the Lagrange pressure gradient model the further assumptions are that gas density in the tube is uniform and speed of sound in the gas is infinite, which means that the gas properties change instantaneously according to the projectile location and velocity.

When this model is used for lumped parameter models, where the propellant is burnt in a finite rate, it is assumed that the unburnt propellant is uniformly distributed throughout the gas, moves at the local gas velocity and burns at a rate dependent on the space mean pressure.

Energy Conservation

Next, the energy conservation equation is introduced in order to get the average temperature change as function of time. One can write:

(The concentrated mass's kinetic energy)+(The gas kinetic energy)+(Heat losses)+(The gas internal energy)=(The Propellant's thermal and chemical energy)

We shall now evaluate each of the components

The Propellant's Thermal and Chemical Energy ($E_1$):

This is the thermal and chemical energy that is released from the propellant at a given time. It is commonly measured in a closed bomb experiment, where the propellant is burnt in a closed chamber of a known volume. The isochoric flame temperature is calculated by measuring the pressure and using the state equation. The energy released for a unit mass is given by $C_v T_c$, where $C_v$ is the specific heat in a constant volume. In our case the volume changes quite rapidly, but we can use the closed bomb results, since it is still a good approximation. In conclusion, the total energy released from the propellant at a given time is $E_1 = m_p Z(t) C_v T_c$.

The Internal Energy of the Gas ($E_2$):

The internal energy of the gas is given by $E_2 = m_p Z(t) C_v T_g$.

The Gas Kinetic Energy ($E_3$):

The exact answer to this problem can be given only by using a multi-phase flow simulation. In gun simulations the kinetic energy of the flow has a secondary effect in conventional discharge velocities of the projectile, and plays a crucial role only if the projectile velocities exceed 2400 msec. Here we make the simplifying assumption that the flow has a uniform density, as was done for the pressure gradient model. Uniform density implies that the velocity grows linearly from the combustion chambers front edge (where the flow is in stagnation) to the concentrated mass base. Under our assumptions the kinetic energy of the gas is $$E_3 = \frac{1}{2}\left[\frac{m_p Z(t)}{3}\right]\dot{x}^2.$$

This approximate model is commonly used for lumped parameters models in conventional gun systems and produces satisfactory results.

The concentrated mass kinetic energy ($E_4$): It is simply given by $$E_4 = \frac{1}{2}M\dot{x}^2.$$

Energy Losses Due to Heat Loss to the Tube Walls ($E_h$):

An empirical model, evaluating the energy losses from the gas due to heat transfer to the tube, was developed by Hunt particularly for small caliber guns. In this model the energy losses are given by:

$$E_h = \frac{0.38 d_t^{1.5}[x + V_{c,0}/A_t]T_c\dot{x}^2}{[1 + 0.6 d_t^{2.175}/m_p^{0.8375}]V_m^2} \tag{107}$$

$V_m$[m/sec] is the velocity at which the concentrated mass exits from the tube. Notice that $V_m$ is unknown, therefore the solution must be found iteratively. Since the energy losses have a relatively small effect on $V_m$, only 2-3 iterations are required. We also looked at the heat loss model of Nordein and a turbulent boundary layer model, which are used in lumped parameter models and PDE models. The energy losses obtained with the use of Nordein's model and the turbulent boundary layer model were very similar to Hunt's model. That reassures that we have a good estimation of the energy losses due to heat transfer.

The energy conservation equation is now: $E_1 = E_2 + E_3 + E_4 + E_h$, and after substitution:

$$m_p Z(t) C_v T_c = m_p Z(t) C_v T_g + \frac{1}{2}\left[\frac{m_p Z(t)}{3} + M\right]\dot{x}^2 + E_h \tag{108}$$

State Equation and Mass Conservation

We will make use of the Noble-Able state equation for the average thermodynamic properties of the gas:

$$P_A(V_g - m_g \eta) = m_g \frac{R_0 T_g}{M_W} \tag{109}$$

where:

$T_g$—Gas temperature. $P_A$—Average gas pressure. $V_g$—Gas volume.

$\eta$—Co-volume constant. $R_0$—Universal gas constant. $m_g$—Gas mass.

$M_W$—Gas average molecular mass.

This state equation takes into consideration the co-volume of the gas molecules in high pressure. Due to that phenomenon the gas volume is decreased by $m\eta$, where $\eta$ is called the co-volume constant.

Next, we define the force constant ($\lambda$):

$$\lambda = \frac{R_0 T_c}{M_W} = (\gamma - 1)C_v T_c \tag{110}$$

Substituting equation (110) into the state equation (109) one comes to:

$$P_A\left(\frac{V_g}{m_g} - \eta\right) = \lambda \frac{T_g}{T_c} \Rightarrow P_A = \frac{\lambda m_g T_g}{(V_g - \eta m_g)T_c} \tag{111}$$

The mass of the gas in the combustion chamber and tube is equal to the mass of the propellant burnt:

$$m_g = m_p Z \tag{112}$$

The total volume in the combustion chamber and the tube is equal to that of the gas and solid propellant volume:

$$L \cdot \frac{\pi D^2}{4} + x \cdot A_t = V_g(t) + \left(\frac{m_p}{\rho_p}\right)(1 - Z(t)) \tag{113}$$

Substituting equations (112) and (113) into (111):

$$P_A(t) = \frac{\lambda m_p Z(t) T_g}{\left\{L \cdot \frac{\pi D^2}{4} + x \cdot A_t - m_p\left[\frac{1}{\rho_p} + Z(t)\left(\eta - \frac{1}{\rho_p}\right)\right]\right\}T_c} \tag{114}$$

We shall now introduce $\lambda$ into the energy conservation equation (8):

$$\frac{m_p Z(t)\lambda}{(\gamma-1)} = \frac{m_p Z(t)\lambda}{(\gamma-1)} \frac{T_g}{T_c} + \frac{1}{2}\left[\frac{m_p Z(t)}{3} + M\right]\dot{x}^2 + E_h \quad (115)$$

From the last two equations one gets:

$$P_A(t) = \frac{m_p Z(t)\lambda - \frac{1}{2}(\gamma-1)\left[\frac{m_p Z(t)}{3} + M\right]\dot{x}^2 - (\gamma-1)E_h}{\left\{L \cdot \frac{\pi D^2}{4} + x \cdot A_t - m_p\left[\frac{1}{\rho_p} + Z(t)\left(\eta - \frac{1}{\rho_p}\right)\right]\right\}} \quad (116)$$

Notice that Z(t) can be expressed as a function of r(t), as it is done in equation (104) in our example. Equation (116) is an expression of the average pressure of the gas that changes in time as functions of x(t), $\dot{x}$(t) and r(t).

Propellant Burning Rate

The propellant's steady state burning rate is assumed:

$$\dot{r} = a P_A^n \quad (117)$$

The Equations of Motion of the Concentrated Mass

The concentrated mass equations of motion are:

$$\frac{d\dot{x}}{dt} = \frac{P_B - P_a}{M} A_t \quad (118)$$

$$\frac{dx}{dt} = \dot{x} \quad (119)$$

Solution Scheme

We shall solve the three differential equations (117), (118) and (119), while using the relations in equations (105), (106) and (116).

The initial conditions will be:

$$r(0) = \frac{W+L}{4} - \sqrt{\left(\frac{W+L}{4}\right)^2 - \frac{Z(0)WL}{4}}, \quad (120)$$

$$\dot{x}(0) = 0,$$

$$x(0) = 0$$

The gas initial conditions will be chosen in a way that describes the ignition. It is assumed that a few percent of the propellant are burnt immediately, for example, Z(t=0)=2%. Using that representation enables one to take into account the added energy that comes from the igniter, when looking at the total energy inserted into the system. The sensitivity of the solution to the value of Z(0) was examined. It showed that the value of Z(0) has a secondary effect on the total impulse of the system, as long as the initial pressure is small relatively to the maximum pressure.

Gas Discharge from the Combustion Chamber

At the moment the concentrated mass leaves the tube one stops following the motion of the concentrated mass and the problem is treated with rocket motor equations. The basic assumptions in this model are:

The propellant grains are not ejected out of the tube.
The flow is in thermodynamic equilibrium.
The flow properties change only along the motor axis (one dimensional problem).
The stagnation temperature in the combustion chamber is constant, and equals to the adiabatic flame temperature.
The thermodynamic properties of the gas in the combustion chamber are uniform.
The gas follows the ideal gas equation.
The relation between the pressure and the burning rate of the propellant follows the empirical relation:

$$\dot{r} = a P_c^n \quad (121)$$

The mass conservation equation can be written:

$$\dot{m}_{gas\_gen} - \dot{m}_{nozzle} = \frac{d}{dt}(\rho_c V_c) \quad (122)$$

$V_c$ is the volume of the combustion chamber, including the volume of the tube, and $\rho_c$ is the density of the gas in the combustion chamber.

Just before the concentrated mass leaves the tube, there is a velocity profile of the gas in the tube, going from stagnation in the combustion chamber to the concentrated mass ejection velocity at the tube exit. After the concentrated mass leaves the tube, the gas conditions in the tube will adjust rapidly to the sonic conditions. This transient phenomenon is outside the scope of the present model, and it is assumed to be very rapid and to have a small effect on the total impulse. According to the definition of the characteristic velocity:

$$\dot{m}_{nozzle} = \frac{P_c \cdot A_t}{C^*} \quad (123)$$

The rate of gas generation can be written in the following form:

$$\dot{m}_{gas\_gen} = \rho_p A_b \dot{r} = \rho_p A_b a P_c^n \quad (124)$$

Next, we shall develop the right hand side of the mass conservation equation:

$$\frac{d}{dt}(\rho_c V_c) = \rho_c \frac{dV_c}{dt} + \frac{d\rho_c}{dt} V_c \quad (125)$$

Using the theoretical expression for the characteristic velocity $$C^* = \frac{1}{\Gamma}\sqrt{\frac{R_0}{M_w} \cdot T_c} \quad (126)$$

Therefore, from the ideal gas equation one obtains:

$$\rho_c = \frac{P_c}{RT_c} = \frac{P_c}{(C^*\Gamma)^2} \quad (127)$$

By derivation in respect to time, and assuming that $T_c$ is constant:

$$\frac{d\rho_c}{dt} = \frac{1}{(C^*\Gamma)^2} \frac{dP_c}{dt} \quad (128)$$

The change in the combustion chamber volume is caused by burning of the propellant:

$$\frac{dV_c}{dt} = A_b \cdot \dot{r} = A_b a P_c^n \tag{129}$$

Summing up equations (122) to (129) one gets:

$$\rho_p A_b a P_c^n - \frac{P_c \cdot A_t}{C^*} = \frac{V_c}{(C^*\Gamma)^2}\frac{dP_c}{dt} + A_b a P_c^n \frac{P_c}{(C^*\Gamma)^2} \tag{130}$$

And after some simple arithmetical manipulations:

$$\frac{dP_c}{dt} = \frac{(C^*\Gamma)^2}{V_c}\rho_p A_b a P_c^n - \frac{C^*\Gamma^2}{V_c}P_c \cdot A_t - A_b a P_c^n \frac{P_c}{V_c} \tag{131}$$

Equations (121), (129) and (131) form a set of 3 coupled ordinary differential equations. The initial conditions are taken from the end of the previous stage during which the concentrated mass traveled in the tube.

Thrust Calculations

The thrust in our system is the total force acting on the combustion chamber and the tube. During the time the concentrated mass is traveling in the tube, the trust is given by:

$$F = (P_{breech} - P_a) \cdot A_t \tag{132}$$

Therefore, the equivalent force acting on the combustion chamber is the cross-section area of the tube multiplied by the pressure difference. The net pressure force acting on the tube itself is zero, because it is a cylinder with a constant area. After the concentrated mass leaves the tube, the thrust will be similar to that of a rocket motor with a converging nozzle. The thrust will be written as follows:

$$F = C_F P_c A_t \tag{133}$$

where $A_t$ is the tube cross-section area and $P_c$ the pressure in the combustion chamber.

The tube exit conditions are sonic (the tube is chocked) when the following condition is satisfied:

$$\frac{p_c}{p_a} > \frac{p_c}{p_{cr}} = \left[1 - \left(\frac{\gamma-1}{\gamma+1}\right)\right]^{\frac{\gamma}{1-\gamma}} \tag{134}$$

In the case that sonic conditions exist at the exit, the thrust coefficient $C_F$ is:

$$C_F = \left(\frac{2}{\gamma+1}\right)^{\gamma/\gamma-1}(\gamma+1) - \frac{p_a}{p_c} \approx 1.24 - \frac{p_a}{p_c} \tag{135}$$

If Mach number in the exit is less than one, then:

$$C_F = \Gamma \cdot \sqrt{\frac{2\gamma}{\gamma-1}\cdot\left(1 - \left(\frac{P_a}{P_c}\right)^{\gamma-1/\gamma}\right)} \tag{136}$$

Such a situation may occur at the end of the tail-off, and has almost a negligible effect on the overall performance.

Results of Simulation

Figure 5C:
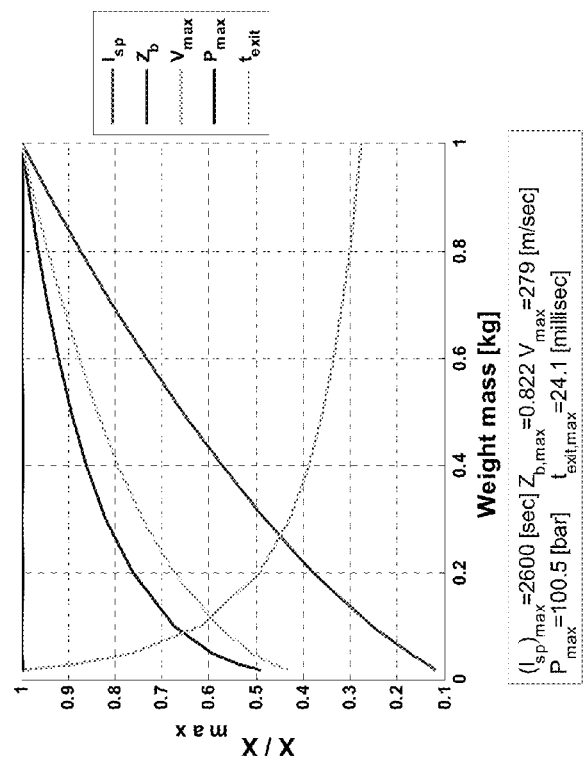
FIG. 5c is a graph showing the variation of a selection of performance parameters as a function of the weight of the concentrated-mass for an embodiment of the concentrated-mass propulsion system using a constant 3.17 grams of propellant.
Figure 5A:
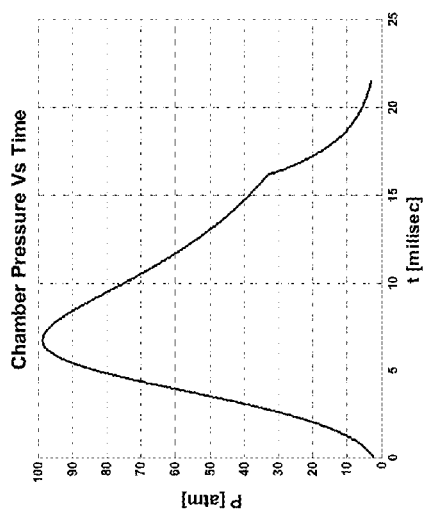
FIG. 5a is a graph showing the average combustion-chamber pressure as function of time for an embodiment of the concentrated-mass propulsion system ejecting a concentrated-mass of weight 0.2 kg.
Figure 5B:
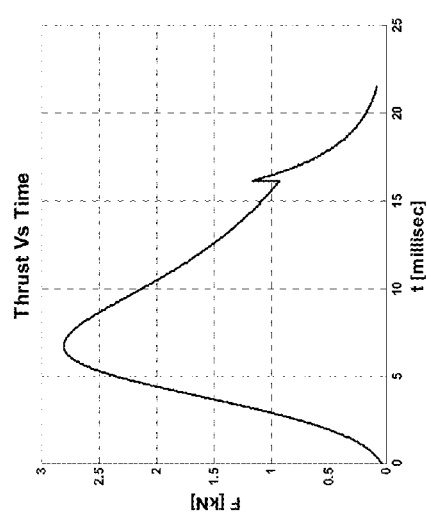
FIG. 5b is a graph of the thrust imparted by an embodiment of the concentrated-mass propulsion system ejecting a concentrated-mass of weight 0.2 kg.

Referring now to FIGS. 5a-g, the results of an interior ballistics simulation are presented. Typical simulation results of the thrust and chamber pressure as function of time are shown in FIGS. 5a and 5b respectively. The jump in the thrust is caused by the ejection of the concentrated mass.

For the purposes of demonstration only, for the simulation represented in FIGS. 5a and 5b, the operating parameters used were as described below:

Propellant mass: 3.17 g, concentrated mass: 0.2 kg, tube length: 1 m, combustion chamber diameter: 30 mm, combustion chamber length: 50 mm, and tube diameter of 19 mm. Propellant chemical properties: Single-based propellant (nitrocellulose) of type M6

($T_c$=2550K, $\rho_p$=1600 kg/m$^3$, $\gamma$=1.2, $M_w$=24 kg/kmol, n=0.7, $\eta$=10$^{-3}$, $\dot{r}$=1.25 cm/sec@100 atm).

The propellant is in the form of single perforated cylindrical grains which are commonly used for gun systems. Each grain has an outer diameter of 1.3 mm, inner diameter of 0.4 mm and a length of 5.5 mm.

We will now explain the rationale behind the choice of the type of propellant and its geometry. Since the volume increases rapidly due to the concentrated mass movement, we must have a high rate of gas generation in order to create high pressure in the combustion chamber and consequently high thrust. Once the concentrated mass leaves the tube, the pressure in the chamber falls dramatically. Decreased pressure will cause the burning rate to drop and vice versa. The result will be the ejection of unburnt propellant particles through the tube muzzle, which is essentially a waste of energy. Therefore we want all of the propellant to burn while the concentrated mass is still in the tube, and the propellant's chemical properties and geometrical shape were chosen accordingly. For this reason we choose relatively small grains with a large surface area and a propellant with a relatively high burning rate, particularly at high pressure because of the high pressure exponent.

FIG. 5c is a graph showing the variation of a selection of performance parameters as a function of the weight of the concentrated-mass for an embodiment of the concentrated-mass propulsion system using a constant 3.17 grams of propellant.

Referring now to FIG. 5c, a graph is presented showing the variation of system performance as a function of the concentrated mass weight, when the propellant mass and maximum pressure in the combustion chamber remain constant. FIG. 5c shows that for certain system parameters, discharging a concentrated mass of 5 grams generates a specific impulse of 240 seconds, similar to that of a solid propellant rocket. Increasing the weight of the concentrated mass increases the specific impulse. One can see in FIG. 4 that discharging a concentrated mass of 50 grams results in a specific impulse of 460 seconds, and for a concentrated mass of 1 kg one gets a specific impulse of 2600 seconds, ten times more than a solid rocket motor!

Additional internal ballistics parameters are also shown in FIG. 5c. In order to maintain a constant maximum pressure in the combustion chamber for the different concentrated mass weights, the diameter of the tube was changed.

As the weight of the concentrated mass is increased, a larger tube diameter is required. This is due to the weight's acceleration, given by:

$$\frac{d\dot{x}}{dt} = \frac{P_B - P_a}{M}A_t \tag{139}$$

It can be seen that if we increase the weight of the concentrated mass, its acceleration for a certain base pressure decreases. It results in a slower expansion of the gas and therefore in a pressure rise. In order to prevent that pressure rise we can increase the gas expansion rate by increasing the tube diameter, which results in a larger acceleration of the concentrated mass and a faster expansion of the gas.

Note that geometrical variations of the combustion chamber and tube can affect the performance of the system. The values shown in FIG. 5c have not been optimized for maximum impulse. In the next section we will discuss the way in which the geometry of the combustion chamber and tube affects the system's performance.

Referring now to FIGS. 5d-g, we investigate the influence of the geometrical parameters of the system, namely the volume of the combustion chamber and the length and diameter of the tube, on the specific impulse of the system ($I_{sp}$), the part of the propellant burnt by the time the concentrated mass leaves the tube ($Z_b$), the velocity and time at which the concentrated mass leaves the tube ($V_{max}$ and $t_{exit}$), and the maximum pressure at the base of the combustion chamber ($P_{max}$). In FIG. 5 the volume of the combustion chamber was altered by changing its length. Note that in our interior ballistic model, changing the diameter of the combustion chamber would have the same effect.

Figure 5E:
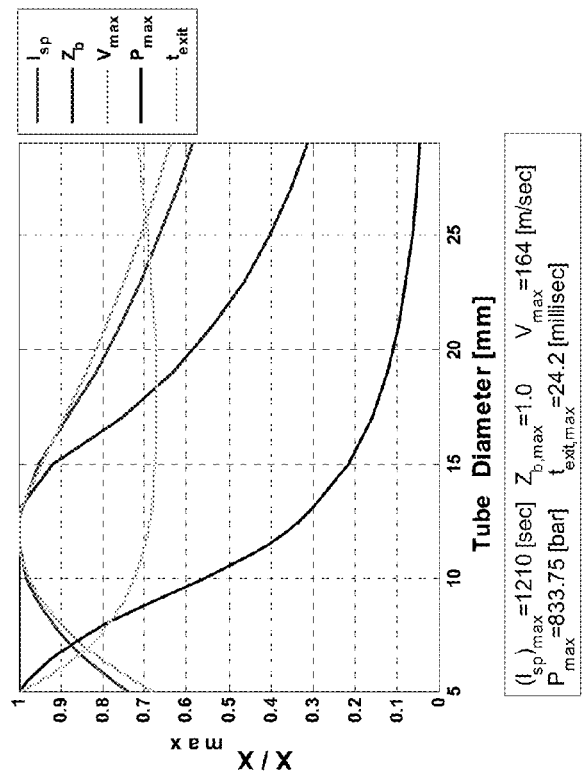
FIG. 5e is a graph showing the variation of a selection of performance parameters as a function of the tube diameter, for an embodiment of the concentrated-mass propulsion system using a constant 3.17 grams of propellant to eject a concentrated-mass of weight 0.2 kg.
Figure 5D:
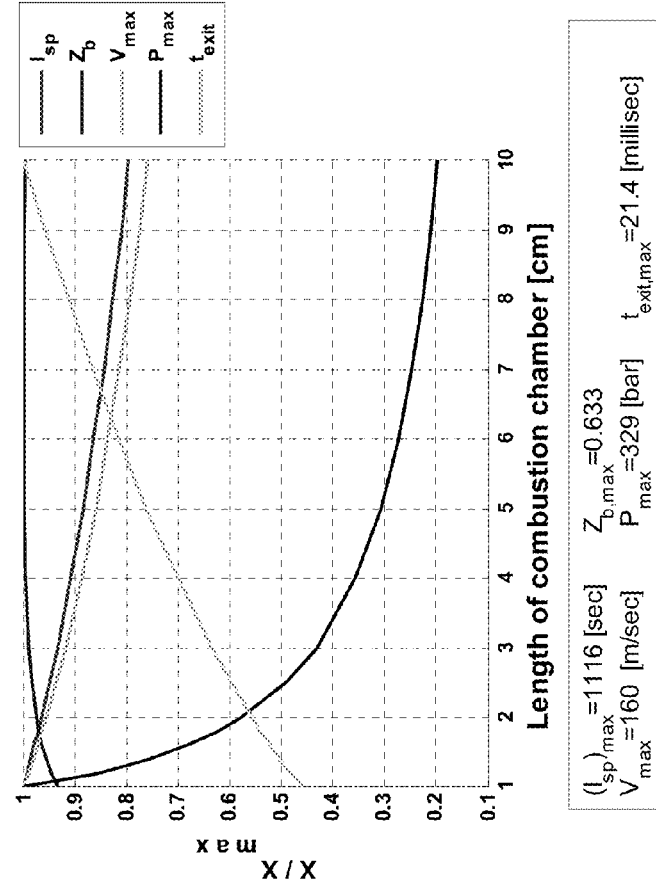
FIG. 5d is a graph showing the variation of a selection of performance parameters as a function of the combustion chamber length, for an embodiment of the concentrated-mass propulsion system using a constant 3.17 grams of propellant to eject a concentrated-mass of weight 0.2 kg.

FIG. 5d is a graph showing the variation of a selection of performance parameters as a function of the combustion chamber length, for an embodiment of the concentrated-mass propulsion system using a constant 3.17 grams of propellant to eject a concentrated-mass of weight 0.2 kg. It is noted that FIG. 5d reveals that when the length of the combustion chamber is increased by a factor of ten (form 1 to 10 centimeters), the maximum pressure decreases by 80%, whereas the specific impulse decreases by only 20%. This leads to the conclusion that the effect of increasing the volume of the combustion chamber on the maximum pressure is much greater than its effect on the total impulse. Therefore a combustion chamber with relatively large volume can be considered, since we want to get high total impulse while avoiding high pressures.

FIG. 5e is a graph showing the variation of a selection of performance parameters as a function of the tube diameter, for an embodiment of the concentrated-mass propulsion system using a constant 3.17 grams of propellant to eject a concentrated-mass of weight 0.2 kg. It is noted that FIG. 5e shows the effect of the tube diameter on the system performance. Increasing the tube diameter results with faster expansion of the gas, and thus lower pressures. The influence of the tube diameter on the impulse is not straightforward. Since the thrust in the system is given by:

$$F=(P_{breech}-P_a)\cdot A_t \quad (140)$$

The tube diameter has a dual effect on the impulse. Increasing the tube diameter both decreases the combustion chamber base pressure ($P_{breech}$) and increases the tube cross-section area ($A_t$). In FIG. 5e we see the consequence of this dual effect, as there is a specific tube diameter that results in a maximum impulse.

Figure 5G:
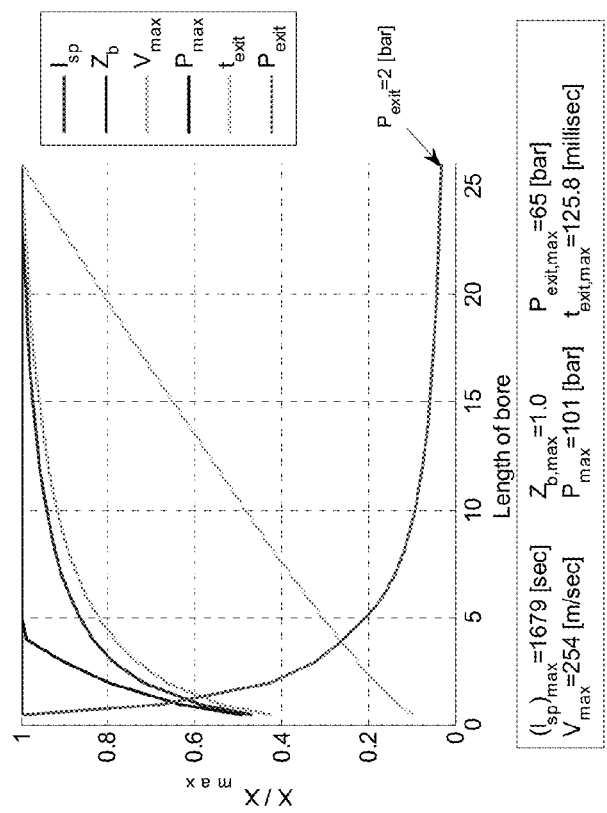
FIG. 5g is a graph showing the variation of a selection of performance parameters as a function of the ejection-tube length for an embodiment of the concentrated-mass propulsion system using a constant 3.17 grams of propellant to eject a concentrated-mass of weight 0.2 kg.
Figure 5F:
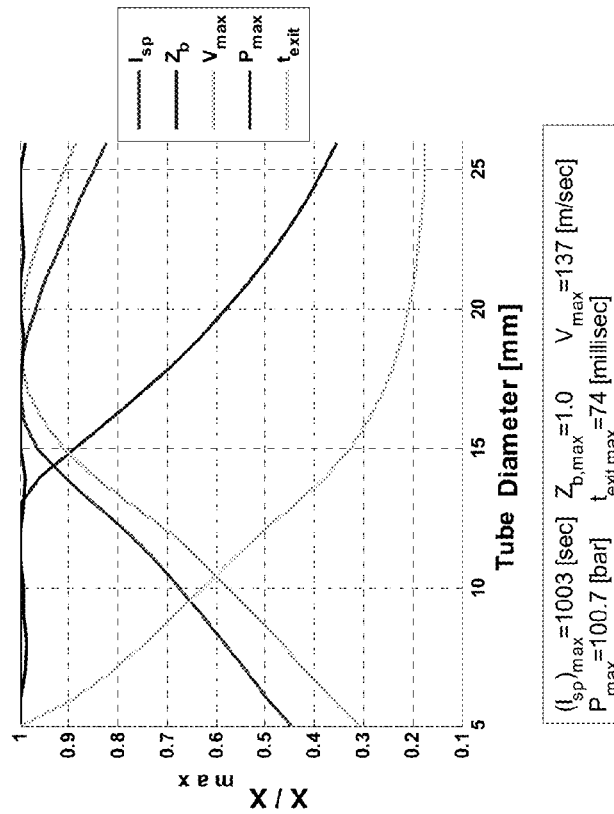
FIG. 5f is a graph showing the variation of a selection of performance parameters as a function of the tube diameter for an embodiment of the concentrated-mass propulsion system using a constant 3.17 grams of propellant to eject a concentrated-mass of weight 0.2 kg, varying the combustion chamber volume in order to keep the same maximum pressure.

FIG. 5f is a graph showing the variation of a selection of performance parameters as a function of the tube diameter for an embodiment of the concentrated-mass propulsion system using a constant 3.17 grams of propellant to eject a concentrated-mass of weight 0.2 kg. In FIG. 5f we consider a case of a given concentrated mass, propellant weight and a maximum allowed pressure, and attempt to find the geometrical parameters that would give the maximum specific impulse.

For the specific system parameters presented in FIG. 5f, attaining a maximum pressure of 100 bar with a tube diameter of 5 mm requires a combustion chamber length of 395 mm. When the tube diameter is increased, the combustion chamber length, required to keep the same maximum pressure, is decreased. Accordingly, a tube diameter of 26 mm requires a combustion chamber length of only 16.9 mm in order to reach the same maximum pressure. Maximum specific impulse is obtained for a tube diameter of 17 mm and combustion chamber length of 76 mm. It is noteworthy that the tube diameter that will give the maximum discharge velocity for the concentrated mass is larger than the tube diameter that will give the maximum specific impulse. This difference stems from the thrust generated by the ejection of the gas.

Another important geometrical parameter is the length of the tube. FIG. 5g is a graph showing the variation of a selection of performance parameters as a function of the ejection-tube length for an embodiment of the concentrated-mass propulsion system using a constant 3.17 grams of propellant to eject a concentrated-mass of weight 0.2 kg.

In FIG. 5g the influence of the tube length on the performance is demonstrated. It can be seen that changing the tube length does not affect the maximum pressure, as long as the tube is long enough for the development of the maximum pressure.

It is evident that the tube length has a major influence on the system performance. By increasing the tube length it is possible to exploit more of the propellant energy. As the tube length is increased, the impulse grows monotonically as long as the pressure at the combustion chamber base is larger than the ambient pressure.

Figure 6A:
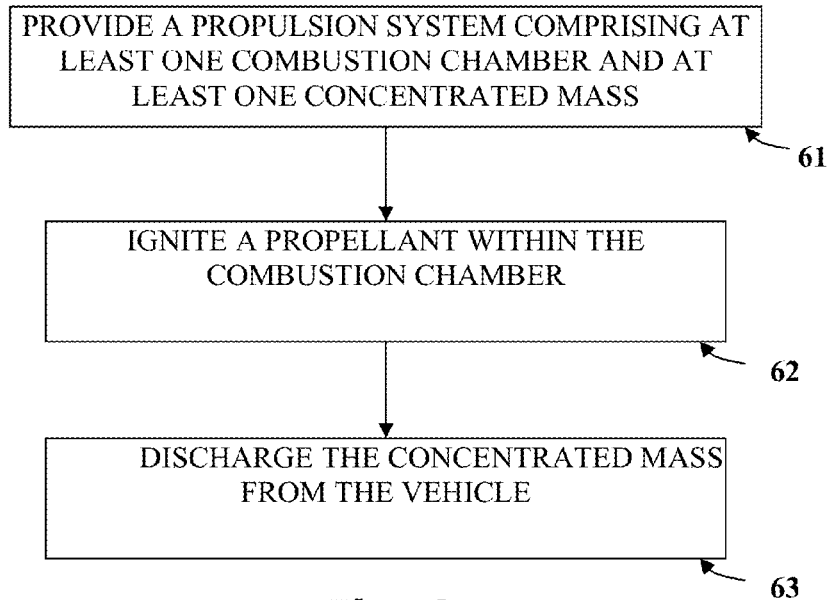
FIG. 6a is a flowchart representing a method for imparting a large impulse upon a vehicle using a concentrated-mass propulsion system.

Referring now to FIG. 6a, a flowchart is shown representing a method for imparting a large impulse upon a vehicle using embodiments such as described above. The method includes the steps of: (Step A) providing a propulsion system comprising at least one combustion chamber and at least one concentrated mass 61; (Step B) igniting a propellant within the combustion chamber 62; and (Step C) discharging the concentrated mass from the vehicle 63. Typically an ejection tube is provided through which the concentrated mass may be discharged.

Once the required impulse and vehicle are defined, one can decide on the geometry of the combustion chamber and tube, the weight of the concentrated mass and propellant, and the type of the propellant. Those parameters of the propulsion system can be evaluated by using computations with models, such as the lumped parameter model or two phase flow model described hereinabove, or using experimental data for example.

Figure 6B:
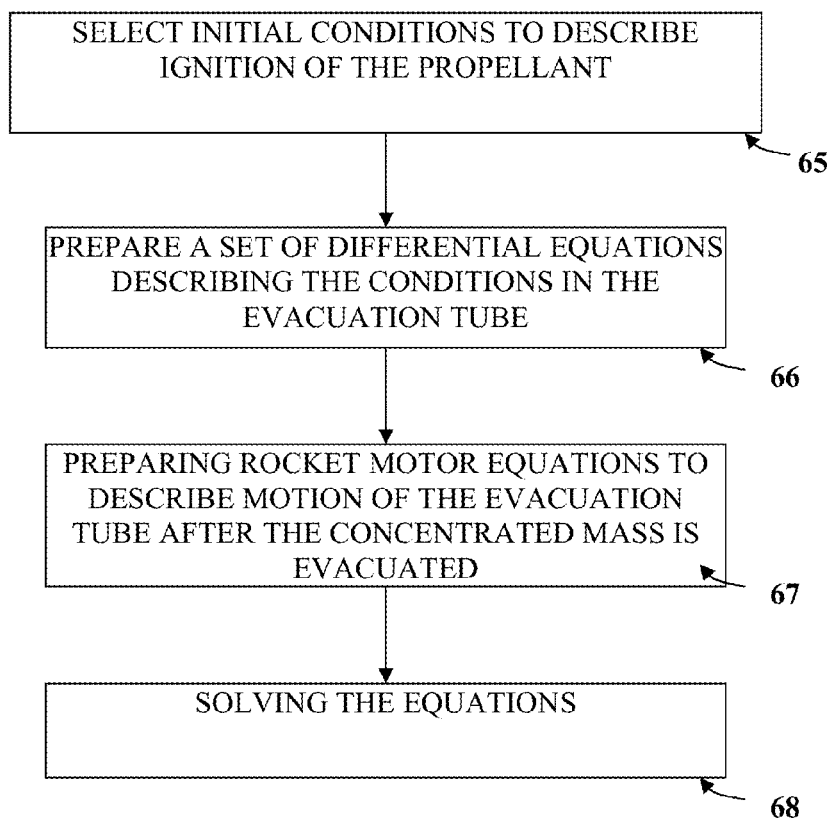
FIG. 6b is a flowchart representing a method for optimizing parameters of a concentrated-mass propulsion system.

Referring now to FIG. 6b, a flowchart is shown representing a method for optimizing the parameters of the propulsion system so as to maximize impulse imparted upon the vehicle. The optimization method may include the steps of: (Step I) selecting initial conditions to describe ignition of the propellant 65; (Step II) preparing a set of differential equations describing the conditions in the evacuation tube 66; and (Step III) preparing rocket motor equations to describe motion of the evacuation tube after the concentrated mass is evacuated 67, and (Step IV) solving the equations 68.

It is noted that the differential equations describing the conditions in the evacuation tube may be prepared using various techniques such as:
  simulating the movement of the concentrated mass through the evacuation tube using an interior ballistics model;
  representing the spatial distribution of gas momentum in the evacuation tube by a pressure gradient model;
  introducing an energy conservation equation describing change in average temperature as a function of time; and using Noble-Able state equations for the average thermodynamic properties of gas contained by the evacuation tube.

The scope of the present invention is defined by the appended claims and includes both combinations and sub combinations of the various features described hereinabove as well as variations and modifications thereof, which would occur to persons skilled in the art upon reading the foregoing description.

What is claimed:

1. A propulsion system configured to exert a force and impart an impulse upon at least one vehicle, said system comprising:
   at least a first vehicle comprising at least one chamber containing propellant;
   at least one exhaust ejection tube connected to said at least one chamber, wherein said at least one exhaust ejection tube is non-conical; and
   at least one concentrated mass, at least partially located within said at least one exhaust ejection tube and configured to be discharged from said first vehicle through said at least one exhaust ejection tube when said propellant is activated so as to impart an impulse and a force upon said first vehicle in a direction opposite to the motion direction of said concentrated mass while moving within said at least one exhaust ejection tube, and wherein said concentrated mass is configured to travel along said at least one exhaust ejection tube before it is expelled from said first vehicle.

2. The propulsion system of claim 1, wherein the chamber is the inner volume of the at least one exhaust ejection tube through which said concentrated mass is discharged.

3. The propulsion system of claim 1, wherein said propellant comprises a fuel configured to generate high pressure products upon combustion.

4. The propulsion system of claim 1, wherein said propellant is selected from the group consisting of solid propellant, liquid propellant, compressed gas, and a combination thereof.

5. The propulsion system of claim 1, wherein said concentrated mass is entirely contained within said at least one exhaust ejection tube before it is ejected.

6. The propulsion system of claim 1 further comprising a loading mechanism, said loading mechanism being capable of introducing a new concentrated mass into said at least one exhaust ejection tube and introducing new propellant into said chamber, after said concentrated mass was discharged from said first vehicle through the at least one exhaust ejection tube.

7. The propulsion system of claim 1, wherein said concentrated mass is selected from the group consisting of a dead-weight, a discarded section of said first vehicle, a discarded case of a propellant charge, a traveling charge, a second vehicle, and combinations thereof.

8. The propulsion system of claim 1, wherein said first vehicle is selected from the group consisting of rockets, missiles, spacecraft, space stations, satellites, rocket stages, and combinations thereof.

9. The propulsion system of claim 1, further comprising a second vehicle, wherein the propulsion system is configured to separate said first vehicle from said second vehicle, wherein:
   said first vehicle serves as a first concentrated mass for propelling said second vehicle, and
   said second vehicle serves as a second concentrated mass for propelling said first vehicle.

10. The propulsion system of claim 9, wherein said first and second vehicles are selected from the group consisting of satellites, spacecraft, space stations, rocket stages, and combinations thereof.

11. The propulsion system of claim 1, wherein concentrated mass comprises at least one of the group consisting of solid masses, liquids, gels, powdered materials, and combinations thereof.

12. A separation system comprising:
   a first vehicle comprising:
      at least one chamber containing propellant; and
      at least a first tube connected to said at least one chamber, wherein said first tube has an open end;
   a second vehicle; and
   a separation mechanism, said separation mechanism comprising:
      said first tube, connected to said first vehicle; and
      a second tube, connected to said second vehicle, wherein said second tube has an open end,
      wherein said first tube and said second tube are nested one inside the other such that said open end of said first tube is inserted inside said open end of said second tube, such that, when said propellant is activated within said chamber, opposing forces are exerted upon said first vehicle and upon said second vehicle thereby separating said first vehicle from said second vehicle.

13. The propulsion system of claim 1, wherein a series of pulse systems are installed where each system is applied as the concentrated mass of the next pulse round.

14. A method for imparting an impulse and a force upon a vehicle, said method comprising:
   providing a first vehicle having a propulsion system comprising:
      at least one chamber, capable of containing propellant;
      at least one exhaust ejection tube connected to said at least one chamber, wherein said at least one exhaust ejection tube is non-conical; and
      at least one concentrated mass, at least partially located within said at least one exhaust ejection tube, and configured to be discharged from said first vehicle through said at least one exhaust ejection tube when said propellant is activated so as to impart an impulse and a force upon said first vehicle in a direction opposite to the motion direction of said concentrated mass while moving within said at least one exhaust ejection tube, and wherein said concentrated mass is configured to travel along said at least one exhaust ejection tube before it is expelled from said first vehicle; and
   activating said propellant within said chamber thereby causing the discharge of said at least one concentrated mass from said at least one exhaust ejection tube.

15. The method of claim 14, wherein activating said propellant comprises igniting said propellant.

16. The method of claim 14, wherein said propellant comprises a compressed gas, and activating said propellant comprises releasing said compressed gas.

17. The method of claim 14 wherein said concentrated mass is entirely contained within said at least one exhaust ejection tube and wherein said concentrated mass is discharged through the at least one exhaust ejection tube.

18. The method of claim 14, wherein said concentrated mass is selected from the group consisting of a dead-weight, a discarded section of said first vehicle, a discarded case of a propellant charge, a traveling charge, a second vehicle, and combinations thereof.

19. A propulsion system configured to exert a force and impart an impulse upon at least one vehicle, said system comprising:
- at least a first vehicle comprising:
  - at least one chamber containing propellant;
  - at least one exhaust ejection tube connected to said at least one chamber, wherein said at least one exhaust ejection tube has an open end; and
- at least one concentrated mass, at least partially located within said at least one exhaust ejection tube, and configured to be discharged from said first vehicle through said at least one exhaust ejection tube when said propellant is activated so as to generate compressed gas and impart an impulse and a force upon said first vehicle in a direction opposite to the motion direction of said concentrated mass while moving within said at least one exhaust ejection tube,
- wherein said at least one exhaust ejection tube has a section of a constant internal diameter, and
- wherein the length of said section of a constant internal diameter is at least three times said constant diameter.

20. The propulsion system of claim 19, wherein said concentrated mass is configured to travel along said at least one exhaust ejection tube for a distance of at least three times said constant diameter.

21. The propulsion system of claim 19, wherein said concentrated mass is a second vehicle.

22. The propulsion system of claim 21, wherein said second vehicle comprises a second tube having an open end and a closed end,
- wherein said at least one exhaust ejection tube and said second tube are nested one inside the other such that said open end of said at least one exhaust ejection tube is inserted inside said open end of said second tube,
- such that when said propellant is activated within said chamber, opposing forces are exerted upon said first and said second vehicle thereby separating said first vehicle from said second vehicle.

* * * * *